United States Patent
Gluskin et al.

(10) Patent No.: US 9,670,645 B2
(45) Date of Patent: Jun. 6, 2017

(54) AUTOMATED BELOW GROUND CABLE INSTALLATION WITHIN A SELECT FILL APPARATUS AND METHOD

(71) Applicant: QUANTA ASSOCIATES, LP, Houston, TX (US)

(72) Inventors: Mark A. Gluskin, Danville, CA (US); Karl Quackenbush, Blanchard, MI (US); James M. Baker, Jr., Mount Pleasant, MI (US); Rick Harrison, Anderson, SC (US); Edward Specht, Jr., Vassar, MI (US); Brian Kelly, Pioneer, LA (US)

(73) Assignee: Quanta Associates, LP, Houston, TX (US)

( * ) Notice: Subject to any disclaimer, the term of this patent is extended or adjusted under 35 U.S.C. 154(b) by 0 days.

(21) Appl. No.: 14/640,937

(22) Filed: Mar. 6, 2015

(65) Prior Publication Data

US 2015/0252551 A1    Sep. 10, 2015

Related U.S. Application Data

(60) Provisional application No. 61/949,009, filed on Mar. 6, 2014.

(51) Int. Cl.
| | |
|---|---|
| *E02F 5/10* | (2006.01) |
| *E02F 5/12* | (2006.01) |
| *E02F 5/06* | (2006.01) |
| *H02G 1/06* | (2006.01) |

(52) U.S. Cl.
CPC ............ *E02F 5/12* (2013.01); *E02F 5/06* (2013.01); *H02G 1/06* (2013.01)

(58) Field of Classification Search
CPC combination set(s) only.
See application file for complete search history.

(56) References Cited

U.S. PATENT DOCUMENTS

| | | |
|---|---|---|
| 4,629,363 A | 12/1986 | Rose et al. |
| 4,830,537 A | 5/1989 | Munro et al. |
| 5,070,632 A * | 12/1991 | Gilbert .............. E02F 5/06 37/360 |
| 5,573,347 A | 11/1996 | Miles et al. |
| 5,701,692 A | 12/1997 | Woodall |
| 5,827,013 A | 10/1998 | Fluharty et al. |

OTHER PUBLICATIONS

Shane Thomas, PCT International Search Report, Jun. 18, 2015, 2 pages, ISA/US, Commissioner for Patents, United States.
Shane Thomas, PCT Written Opinion of the International Searching Authority, Jun. 18, 2015, 4 pages, ISA/US, Commissioner for Patents, United States.

* cited by examiner

*Primary Examiner* — Kyle Armstrong
(74) *Attorney, Agent, or Firm* — Mark A. Oathout; Oathout Law Firm

(57) ABSTRACT

The cable embedding device is used to install a cable, such as a copper cable, together with filler material within a void trenched into the surrounding land area. The cable embedding device has a hopper, and a chute extending from a lower end of the hopper. The chute includes a plowing edge attached to a leading edge of the chute. A tube is connected to the device inside the hopper and extending along a major axis of the chute. An arch is formed at a lower edge of the chute.

4 Claims, 5 Drawing Sheets

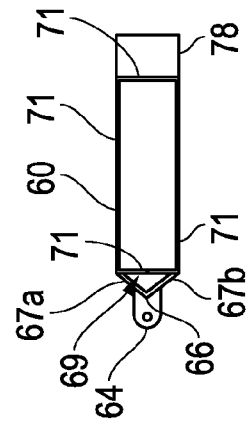
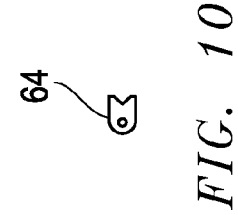
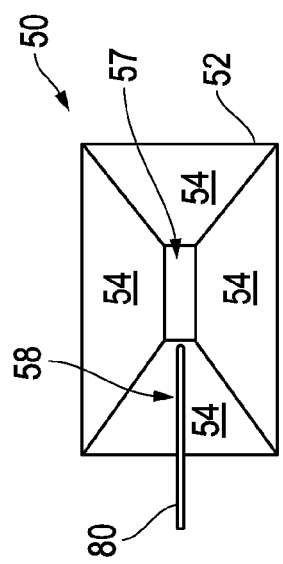
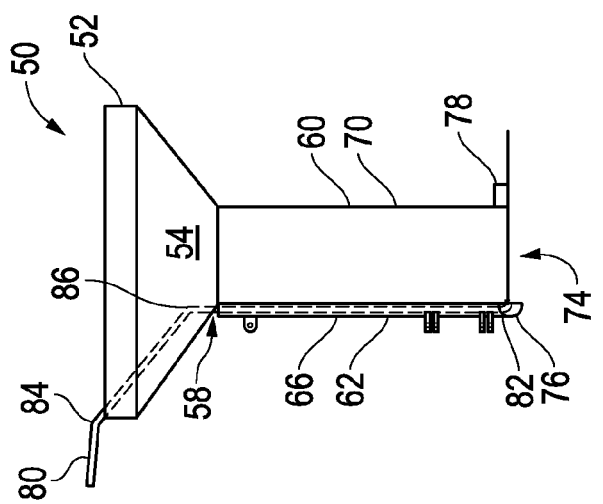

AUTOMATED BELOW GROUND CABLE INSTALLATION WITHIN A SELECT FILL APPARATUS AND METHOD

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

TECHNICAL FIELD

Embodiments of the invention relate to devices and techniques for installing grounding cable into a client's or customer specified fill below the surface of the ground.

BACKGROUND

Cable may be installed underground in a variety of applications. In one such application pipelines may be installed near or below electrical transmission lines. This application may be desirable to mitigate the opportunity for alternating current to interfere in the pipeline as a result of the overhead electrical transmission lines.

In the past, alternating current mitigation projects have been performed by excavating a ditch, next filling the ditch with selected backfill material(s) and, then, laying the cable into the backfill material(s) carefully such that the cable was centered in the backfill material(s). The foregoing is a time consuming process and the quality can be less than desirable.

BRIEF SUMMARY

The cable embedding device is used to install a cable, such as a copper cable, together with filler material within a void trenched into the surrounding land area. The cable embedding device has a hopper, and a chute extending from a lower end of the hopper. The chute includes a plowing edge attached to a leading edge of the chute. A tube is connected to the device inside the hopper and extending along a major axis of the chute. An arch is formed at a lower edge of the chute.

As used herein, the term "AC" shall refer to or mean alternating current.

As used herein, "filler material" shall refer to any conductive packing or other inlaid or in-poured material or layer in the form of an additive, including, hardened materials (e.g. cementitious materials, or otherwise, that are not initially fixed or fastened but later fix, fasten, and/or cure), powders (e.g., a mixture of gypsum/bentonite) and liquids/gels.

BRIEF DESCRIPTION OF THE DRAWINGS

The embodiments may be better understood, and numerous objects, features, and advantages made apparent to those skilled in the art by referencing the accompanying drawings.

These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 6 is a top view of an embodiment of the cable embedding device.

FIG. 7 is a side elevation view of an embodiment of the cable embedding device.

FIG. 8 is a trailing edge elevation view of an embodiment of the cable embedding device.

FIG. 9 is a top view of an embodiment of a chute.

FIG. 10 is a top view of an embodiment of an adaptor for the cable embedding device.

DETAILED DESCRIPTION OF THE PREFERRED EMBODIMENT(S)

The description that follows includes exemplary apparatus, methods, techniques, and instruction sequences that embody techniques of the inventive subject matter. However, it is understood that the described embodiments may or may not be practiced without these specific details.

Figure 1:
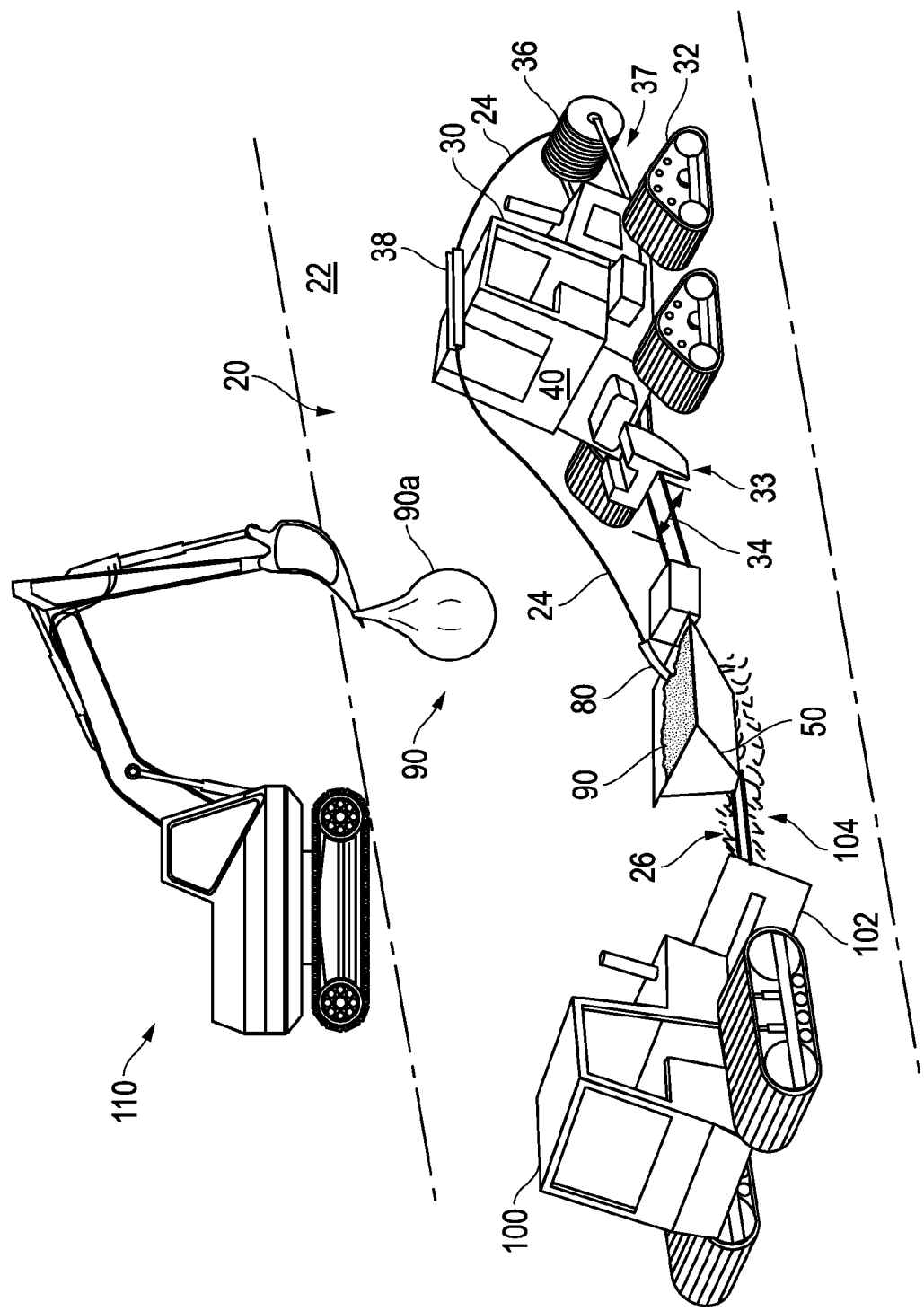
FIG. 1 is a schematic, perspective view of one embodiment of a portable trenching and cable embedding system/device operating within a field or land area.

FIG. 1 depicts a schematic view of an embodiment of a portable trenching and cable embedding system/device 20 operating within a field, site, earth or land area 22 for installing or burying a cable 24 into a void 26 (e.g. such as a trench as shown or ditch). The portable trenching and cable embedding system/device 20 generally includes a first vehicle 30, a cable embedding device 50, and a second vehicle 100. A loader 110 may also be implemented for adding filler material 90 into the cable embedding device 50. The cable 24 may be any suitable grounding cable, ribbon or AC mitigation material such as, for example, but not limited to, copper and/or zinc. The land area 22 could also include or cross pavement, concrete, road base, combinations of the foregoing or other land surface area in the path desired for burying the cable 24.

The first vehicle 30 may, for example, be a tractor or dozer 32. The rear end 33 of the first vehicle 30 includes a commercially available trencher attachment 34 (e.g. such as those sold under the VERMEER brand or the like). A cable feed device such as a spool 36 is mounted to the first vehicle 30, such as, for example, proximate the front 37 of the first vehicle 30. A trough, sleeve or partial sleeve 38 may be mounted on top of the cab 40 of the first vehicle 30. In the embodiment shown, the cable 24 is shown wound around the spool 36 and running over the cab 40 through the trough 38 for feeding the cable 24 to the cable embedding device 50.

Figure 2:
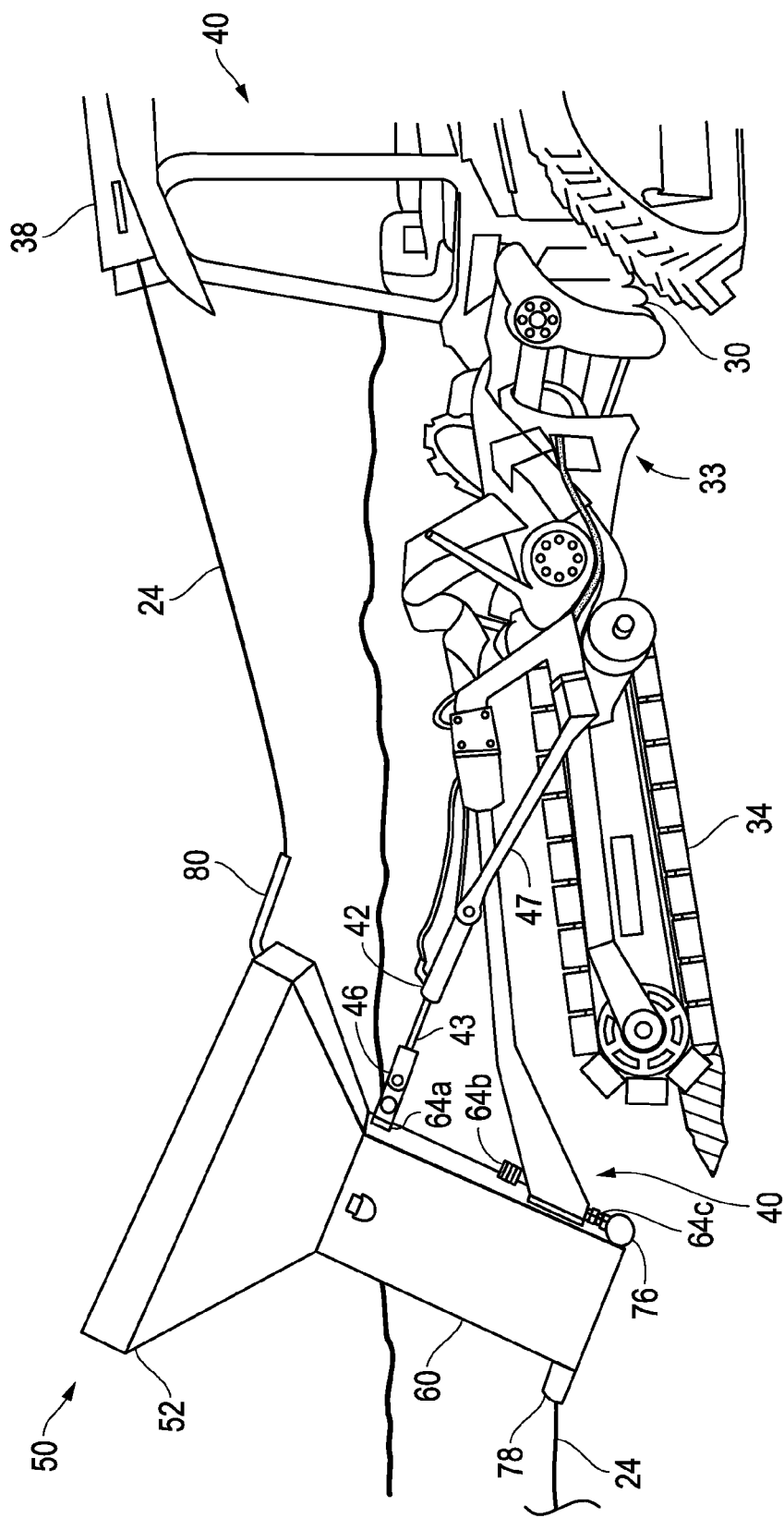
FIG. 2 is an elevation view of an embodiment of a portable trenching and cable embedding system/device with the trencher and cable embedding device raised for inspection or transport.
Figure 5:
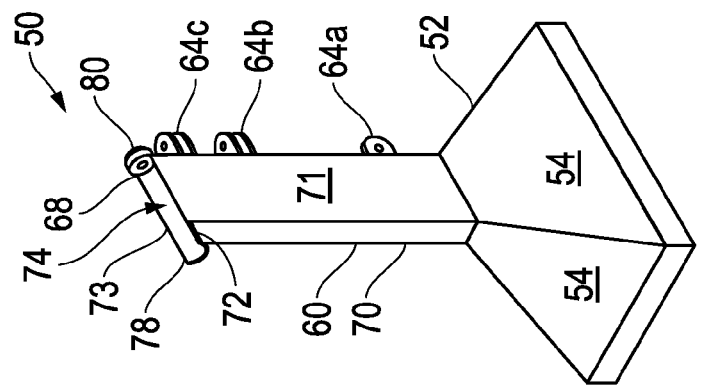
FIG. 5 is a perspective view of an embodiment of a cable embedding device in the inverted position.
Figure 4:
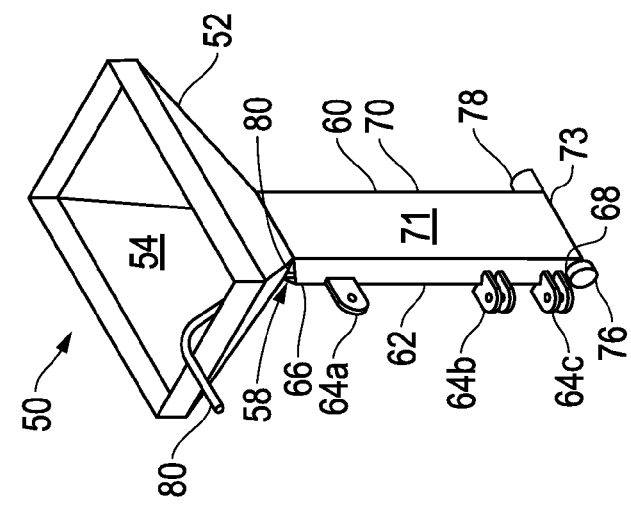
FIG. 4 is a perspective view of an embodiment of a cable embedding device viewed from the leading edge.
Figure 3:
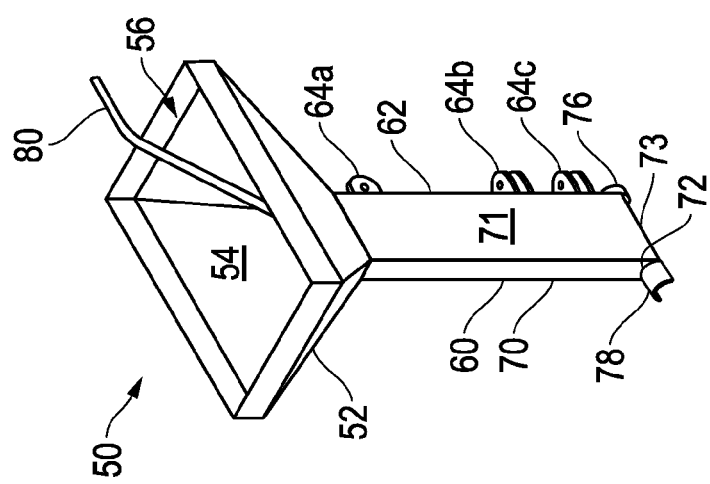
FIG. 3 is a perspective view of an embodiment of a cable embedding device viewed from the trailing edge.
Figure 11:
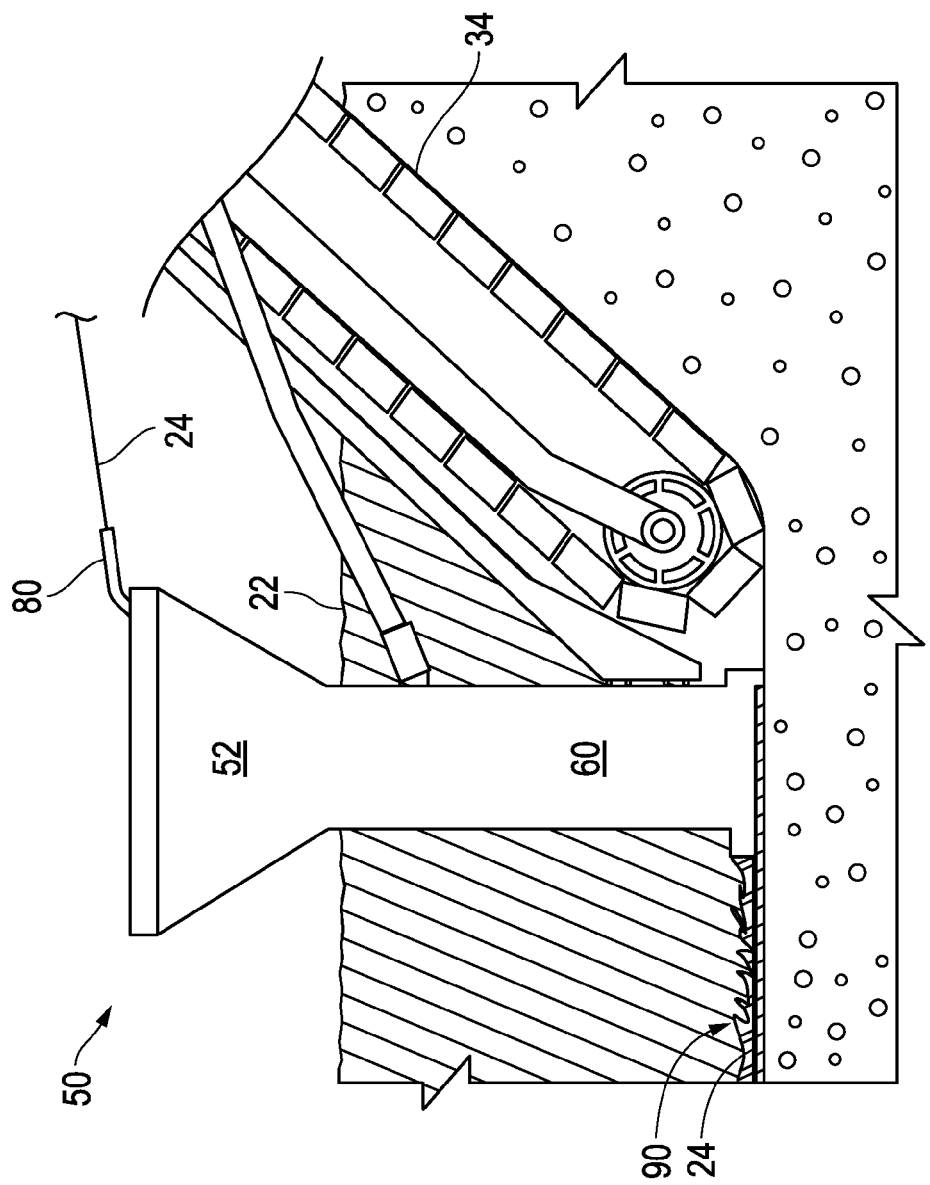
FIG. 11 is a schematic view in section of an embodiment of a portable trenching and cable embedding system/device showing trenching and embedding a cable into and below ground surface.

Referring to FIG. 2, the first vehicle 30 is again shown in an embodiment with the cable 24 running from the trough 38 to a tube or channel 80 of the cable embedding device 50. The cable 24 runs through the cable embedding device 50 via the tube 80 and emerges proximate the end cap 76 for running along the lower edge 73 of a chute 60, below and out of an arch 78.

The trencher attachment 34 is shown connected to the first vehicle 30. An adapter 40 links the first vehicle 30 with trencher attachment 34 to the cable embedding device 50. The adaptor 40 in the embodiment shown includes a hydraulic cylinder 42 and a brace 44. The rod 43 extendable from the hydraulic cylinder 42 is joined to fastening support 64*a* of cable embedding device 50 via linkage 46. At the other end the hydraulic cylinder 42 in connected to an arm 47 attached to the trencher attachment 34 (and/or first vehicle 30). The brace 44 is joined at one end to the trencher attachment 34 (and/or first vehicle 30) and at the other end to fastening supports 64*b* and 64*c*.

In other embodiments (not shown but commercially available) the trencher attachment 34 could be part of or mounted to a vehicle separate from the first vehicle 30. In such embodiments, the cable embedding device 50 is connected via an adaptor 40 directly to an embodiment of a first vehicle 30.

Referring to FIGS. 3-10 the cable embedding device 50 generally includes a hopper 52, a chute/conveyer 60, and a tube/channel 80. At a lower end, the tube 80 terminates proximate and joins an end cap 76 redirecting the cable 24 (approximately at a ninety degree angle) along a lower edge 73 below lower opening 74 and beneath an arch 78.

In the embodiment shown, the hopper 52 includes sidewalls 54 which define an upper opening 56 and a lower opening 57. The upper opening 56 is larger than the lower opening 57. The upper opening is sized to receive a filler material 90. The lower opening is sized to feed the chute 60 with the filler material 90. In the embodiment shown, one of the sidewalls 54 defines a through-hole 58 for passage of the tube 80. In another embodiment (not shown) such through-hole 58 may be eliminated with the tube 80 instead running down the interior of the hopper 52 and chute 60.

In the embodiment shown, the chute/conveyor 60 includes a leading edge 62, a trailing edge 70, sidewalls 71, and a lower edge 73 around a lower opening 74. Proximate the lower opening 74 and joined with the lower edge 73, are located an end cap 76 and an arch/partial pipe 78.

The leading edge 62 of the chute 60 functions as a plowing surface (with each sidewall 71 sufficiently near the opposing sidewall 71 to fit within the void or trench 26 initiated by the trencher attachment 34). A plowing edge 66 is formed in the embodiment shown by two plates 67*a* and 67*b* which when viewed in FIG. 9 are attached together at one end and joined to sidewalls 71 at the other respective ends defining a triangular compartment 69 for receiving and housing the tube 80.

An end cap 76 is attached to the lower end of the leading edge 62 and lower end of the tube 80 for receiving the tube 80 and cable 24. The end cap 76 houses a hollow interior and an eye/passage 77 (see FIG. 8) for the cable 24 which in embodiment shown is formed by an elbow 82 in the tube 80 for redirecting the cable 24 at approximately ninety degrees from the longest axial direction of the tube 80 (down the leading edge 62). The end cap 76 also shields the lower edge 73, arched lower edge 72, cable 24 and filler material 90 as the cable embedding device 50 is being plowed through the void 26. In another embodiment the tube 80 may simply terminate at the end cap 76 with the cable threaded out of the tube 80 into the end cap 76, and out of an eye formed through an endplate of the end cap 76.

Fastening supports 64 (64*a*, 64, *b* and 64*c* as shown) are attached to the leading edge 62 such as by welding.

The trailing edge 70 of the chute 60 is formed by one of the shorter sidewalls 71 and in the embodiment shown defines an arched lower edge 72. An arch/partial pipe 78 is attached to the arched lower edge 72.

The tube or channel 80 has been previously described, but in the embodiment shown includes an upper elbow 84 for entering and adjacent a leading edge of the hopper 52, an intermediate elbow 86 adjacent and for redirecting the tube 80 from the hopper 52 to along the chute 60 and the lower elbow 82 previously described. As shown the tube 80 extends through through-hole 58 down along the chute 60 in the triangular compartment 69 but may also run on the interior of the sidewalls 71 generally aligned with the major axis of the chute 60. The tube 80 is attached to the hopper 52, chute 60, plates 67*a* and/or 67*b*, and/or end cap 76 such as by welding. The inner diameter of the tube 80 is greater than the outer diameter of the cable 24.

The filler material 90 is loaded into the hopper 52, runs down the chute 60 and out of the lower opening 74 to surround the cable 24 as the cable 24 runs beneath the lower opening 74. One type of filler material 90 suitable for use in the foregoing is, by way of example only, sold under the CONDUCRETE trademark. The filler material 90 fills or packs around or is contiguous with the cable 24 within the void 26.

A second vehicle 100 such as a bulldozer with a blade 102 trailing the cable embedding device 50 is preferably implemented to backfill the void 26 with existing top soil/loose dirt 104 and to smoothen the surface of the land area 22.

A loader 110 such as a power shovel or excavator can be implemented to transport loose or fluid filler material 90 (or packaged filler material 90*a*) and/or to fill the hopper 52 with filler material 90.

The portable trenching and cable embedding system/device 20 can be used to perform the cable 24 installation using the cable embedding device 50. Instead of excavating a ditch, the cable embedding device 50 is pulled by the first vehicle 30 and the filler material 90 and cable 24 are plowed and/or embedded into the ground. The cable embedding device 50 is pulled by the first vehicle 30 that also carries the spool 36 (i.e. spooled cable). A plowing edge 66 is attached in front of the chute 60 to break up the ground/land area 22 and make it easier to plow. The cable 24 feeds off the front of the first vehicle 30 and into the cable embedding device 50 so that it is distributed at the lower opening 74 into the surrounding filler material 90 which is simultaneously flowing (by force of gravity) out of the chute 60. A second vehicle 100 such as a bulldozer follows the cable embedding device 50 and backfills the void/small trench 26 with the existing top soil 104. A loader 110 is used to fill the hopper 52 as the work progresses.

The cable 24, in the embodiment shown, is unspooled by force of trailing end of cable 24 being anchored into the ground by weight of the backfilled top soil 104 and filler material 90. The cable 24 may be cut as and when needed as known to one having ordinary skill in the art.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A apparatus for embedding a cable into a land area, comprising:
   a hopper;
   a chute extending from a lower end of the hopper;
   wherein the chute comprises a plurality of sidewalls, wherein the plurality of sidewalls each have a lower edge, and wherein each of the lower edges of the plurality of sidewalls defines a lower opening from the chute;
   wherein the chute includes a plowing edge attached to a leading edge of the chute;
   a tube connected to the apparatus for embedding the cable inside the hopper and extending along a major axis of the chute;
   an arch joined to at least one of the lower edges of the plurality of sidewalls of the chute;
   wherein the plowing edge comprises two plates attached together at one end and joined to at least two of the plurality of sidewalls at another respective end defining a triangular compartment for housing the tube;
   a cable extending into the tube proximate the hopper, running through the inner diameter of the tube and emerging at a position proximate and along the lower edges of the plurality of sidewalls of the chute, below and out of the lower opening and the arch;
   a volume of filler material in the apparatus for embedding a cable and flowing out through the lower opening at a position above the cable and continuing to a position around the cable;
   a first vehicle including a trencher attachment, wherein the chute is connected to the first vehicle with an adaptor;
   wherein the adaptor comprises a hydraulic cylinder and a brace, and a rod extendable from the hydraulic cylinder and joined to the plowing edge via a linkage;
   wherein another end of the hydraulic cylinder is connected to an arm attached to the trencher attachment;
   wherein the brace is joined at one end to the trencher attachment and at another end to the plowing edge; and
   a second vehicle including a blade at a position trailing the hopper.

2. The apparatus for embedding the cable according to claim 1, wherein the filler material is a cementitious material.

3. The apparatus for embedding the cable according to claim 1, further comprising a trough mounted on the first vehicle, and wherein the cable extends through the trough and into the tube.

4. The apparatus for embedding the cable according to claim 1, further comprising an end cap attached to the tube at the lower edge of the chute.

* * * * *